United States Patent [19]

Mattson

[11] 3,930,049
[45] Dec. 30, 1975

[54] PROCESS FOR PREPARING A SHELF-STABLE, FLEXIBLE TORTILLA

[75] Inventor: Peter H. Mattson, Hillsborough, Calif.

[73] Assignee: S & W Fine Foods, Inc., San Mateo, Calif.

[22] Filed: Apr. 8, 1974

[21] Appl. No.: 458,876

Related U.S. Application Data

[63] Continuation-in-part of Ser. No. 313,450, Dec. 8, 1972, abandoned.

[52] U.S. Cl. ............... 426/549; 426/412; 426/439; 426/500
[51] Int. Cl.² ......................................... A21D 15/00
[58] Field of Search ........... 426/152, 500, 106, 412, 426/342, 347, 438, 439

[56] References Cited
UNITED STATES PATENTS

| | | | |
|---|---|---|---|
| 2,570,374 | 10/1951 | Pompa | 99/416 |
| 3,585,048 | 6/1971 | Uhlig et al. | 426/124 |
| 3,690,895 | 9/1972 | Amadon et al. | 426/439 |
| 3,830,946 | 8/1974 | Ruhdorfer | 426/347 |

FOREIGN PATENTS OR APPLICATIONS

| | | |
|---|---|---|
| 16,362 | 12/1890 | United Kingdom |

*Primary Examiner*—Raymond N. Jones
*Attorney, Agent, or Firm*—Flehr, Hohbach, Test, Albritton & Herbert

[57] ABSTRACT

A process for forming a packaged, fried, shelf-stable, flexible tortilla. A tortilla is lightly fried in oil at an elevated temperature of 300°–400°F for a limited time of 2–20 seconds selected to retain residual moisture, in excess of 13.5 percent which is sufficient for flexibility. The hot fried tortilla can be rolled and then packaged and sealed in a moisture proof container.

11 Claims, 4 Drawing Figures

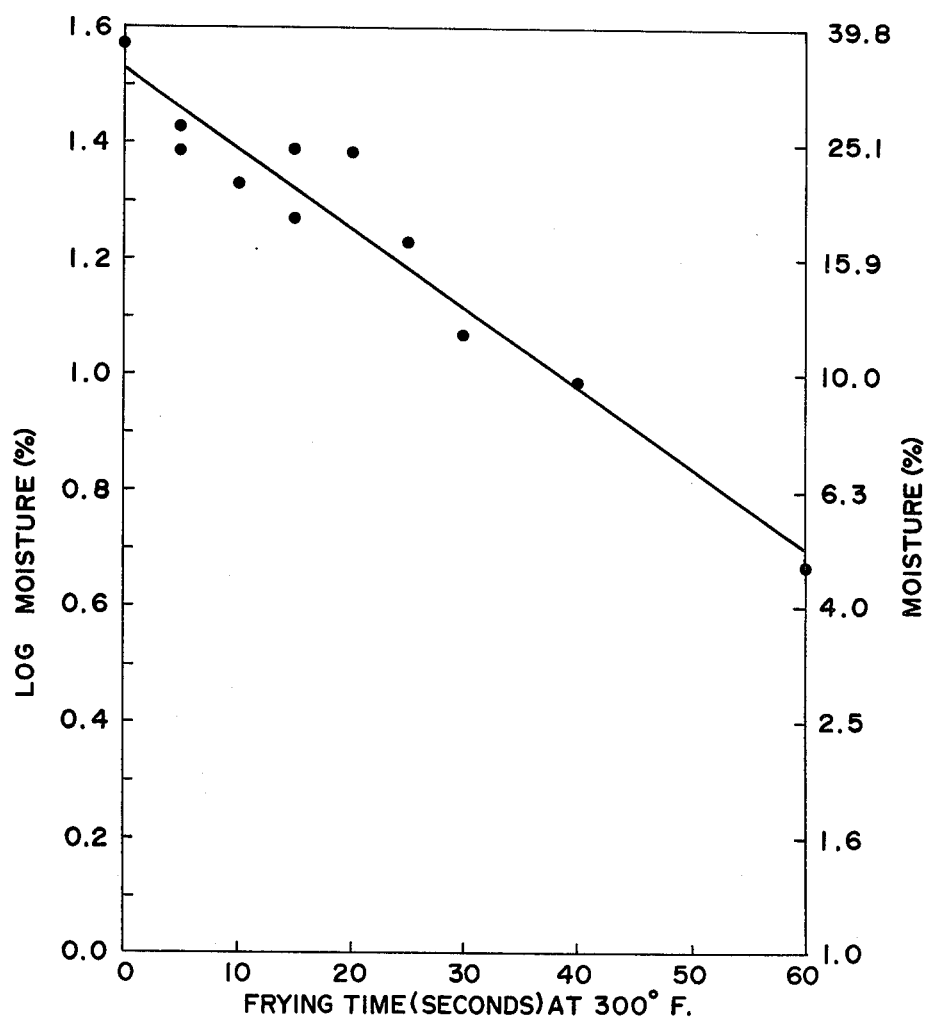
FIG.—3
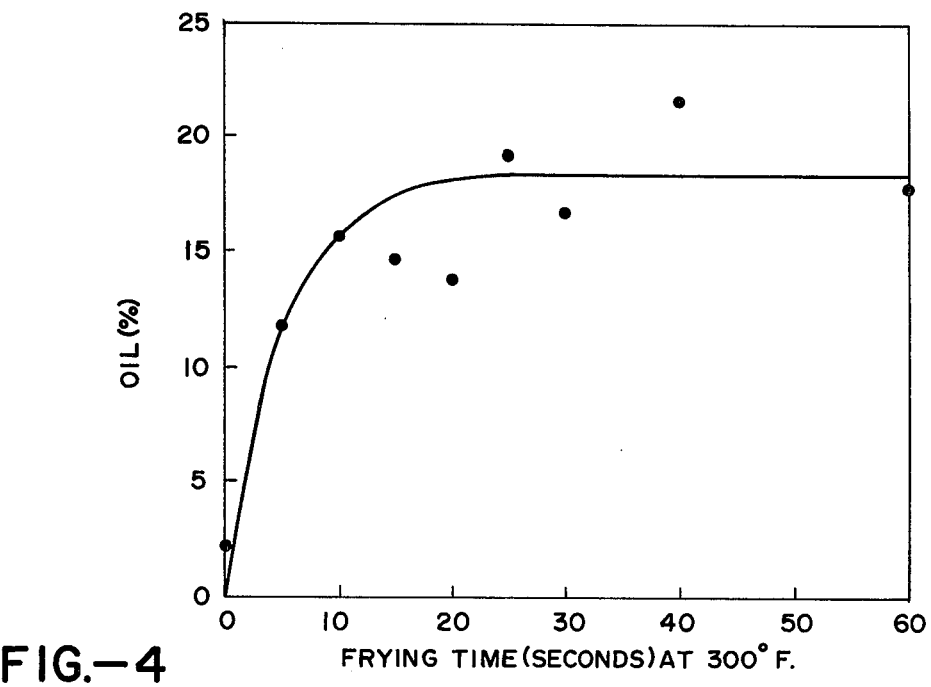
FIG.—4

PROCESS FOR PREPARING A SHELF-STABLE, FLEXIBLE TORTILLA

CROSS-REFERENCE TO RELATED APPLICATION

This application is a continuation-in-part of my co-pending application, Ser. No. 313,450, filed Dec. 8, 1972, and now abandoned.

BACKGROUND OF THE INVENTION

Corn tortillas, an ancient Mexican food product, are presently manufactured and sold by a number of small companies in the United States, principally in the West and Southwest regions. A typical process for preparing such tortillas is initiated by immersing the whole corn kernels in a mixture of water and lime which is heated to about 180°F, the corn being allowed to soak in the water and lime mixture for a suitable period, for example overnight, such that the desired reaction may take place to break down the corn kernels. The excess water-lime fluid is then drained off the corn and the corn is thereafter ground, resulting in a tortilla dough commonly referred to as masa having about 50 to 65 percent moisture content, for example. The tortillas may then be made directly from this dough, or the moisture may be removed from the dough product by suitable known drying techniques to produce a dry corn flour which may be stored for subsequent use by adding water to produce the desired masa or dough for making tortillas.

The masa dough in bulk form is fed into a tortilla oven of a type manufactured by several companies in the United States, the dough being fed through extruding rollers or the like to produce the desired flat sheets, the dough rollers are also provided with means for cutting the flattened dough into the desired tortilla shape. The oven is operated at about 750°F to bake the tortilla. This baking process takes less than one minute, e.g., about 45 seconds, and the tortilla exits the oven with an internal temperature of about 212°F with a moisture content of about 40 to 50%.

Normally, these tortillas are then processed in any one of four different manners. In the most common process, the tortillas are sent along a conveyor belt which is long enough to permit the hot tortillas to cool down sufficiently so that they may be easily handled by workers who collect the tortillas into a suitable number, for example, one dozen, and package these tortillas in a suitable container such as a plastic bag. However, these tortillas are not sterile and so in the most common usage the packaged and sealed tortilla is refrigerated. This refrigerated product is then maintained refrigerated in the retail grocery outlet, commonly in the compartments with the milk and cheese products, until sold to the consumer. The consumer maintains the product refrigerated until use. Like most refrigerated products, the storage time of the packaged tortilla is limited to, for example, one or two months after which the spoilage sets in and the tortilla becomes unsatisfactory for the consumer.

In a second process, the tortilla, immediately after being packaged as described above, is frozen and the frozen tortilla product is then maintained frozen and sold with the frozen foods in the grocery store and kept in the consumer's freezer. The frozen tortilla has a substantially longer lifetime than the refrigerated product although freezing adds to the expense and inconvenience of shipping and storage.

Approximately 90 percent of the refrigerated and frozen packaged tortillas produced by these two processes are utilized by the housewife in making enchiladas and tacos. Typically, the tortilla is unpackaged by the housewife, preferably after thawing the product, in the case of the frozen product, and the tortilla is placed in hot frying oil in a frying pan or the like. The tortilla is fried for a period of time sufficient to produce the desired taste and texture of the end product. The tortilla is then removed from the hot oil and is then processed by the housewife to remove the excess oil such as by wiping the tortilla or placing it between paper towels to soak up the excess oil. The desired meat or meat and bean filling is then placed on the fried tortilla, the tortilla is rolled or folded, suitable sauces or the like may be spread on the product, and the product is then placed in an oven for baking and subsequent serving. In order that the housewife is able to produce this end product, the tortilla must be flexible for rolling and must remain rolled during the preparation and baking process. As with any fried product, the frying procedure is rather messy and involves spattering of oil, removal of excess oil, disposal of the oil after use, and the step of cleaning up the work surface, pans, and person of the housewife.

In a third process, the tortilla may be fried and then filled with the desired end ingredients for producing an enchilada or taco, i.e., a meat filling or a meat and bean filling or the like. Immediately after packaging, the filled tortilla product is frozen and maintained frozen in the retail stores and in the consumer's home freezer until its final preparation for consumption.

In a fourth known process, the tortilla is cut into small triangle chip size pieces which are then deep-fried for about 30 seconds, or more, to produce a tortilla chip much like a potato chip. The end product, after frying, has a very low moisture content such as 2 to 4 percent. These chips are then placed in bags and sold off the shelf in the stores with the other crisp chip products. Because of the very low moisture content, there is no problem with spoilage or the like and these tortilla chips are shelf-stable.

In a fifth process, the whole tortilla is fried for about 30 seconds or more in a U-shaped form until the moisture content is very low as with the chips to form a rigid and brittle taco shell.

SUMMARY OF THE PRESENT INVENTION

The present invention provides a tortilla product and process whereby a pre-fried, shelf-stable, flexible tortilla is made and packaged for sale off the dry grocery shelf to the end consumer, the tortilla being ready for filling and baking by the housewife without refrigeration or the added step of frying the tortilla.

In this novel process, the tortilla is prepared from the masa, by forming and baking in the tortilla ovens in the same manner as performed to date. The masa may be prepared directly from the steeped corn or the masa may be prepared from available dry corn flour which is made into the dough by the addition of water in conventional manner.

The tortillas exit the oven in the standard form with a moisture content of from 40 to 50 percent and at a temperature above 180°F, for example an internal temperature of up to 212°F. While still hot from the oven, the tortillas are fried lightly by being immersed in frying oil which is at a suitable temperature of, for example, from 250° to 450°F, and preferably 275° to 300°F to 400°F. The tortillas remain in the frying oil for a limited time, e.g., between two and twenty seconds. The tortillas are then removed from the frying oil at an elevated temperature, e.g., an internal temperature of up to 212°F. The excess oil is drained or otherwise removed from the tortillas.

The temperature of the frying oil and the frying time is selected to limit the dehydration of the tortilla. In other words, the frying conditions are mild enough that the tortilla retains sufficient moisture for it to remain flexible (e.g., in excess of 13.5 percent). There is a direct relationship between the moisture loss, the time and temperature of frying, and flexibility.

The oil content of the fried tortilla does not significantly affect its flexibility. Longer frying times produce higher oil contents up to a typical maximum of 20–25 percent, depending on the type of oil and absorptivity of the tortilla. Thus, the oil content is determined by the degree of frying required for the desired moisture content. Typical oil content may range from 5 to 24 percent.

The tortillas, while still at a sterile, elevated temperature, are rolled into tight rolls of spiral slightly flattened cross-section and inserted into a flexible package that has a very high resistance to the transmission of moisture or water vapor (e.g., a strong "moisture-proof" bag) which is immediately sealed to maintain the sterility of the tortillas. From eight to twelve tortillas are packaged in each bag.

Although the tortillas have a relatively high moisture content, typically from 15 to 35 percent, the tortillas processed and packaged in this manner are shelf-stable in the retail store for up to one year or more without refrigeration. This stability is due to the packaging of the product while the temperature is still elevated due to heat retained after frying and without the introduction of any contaminant.

The end user, when preparing, first places the unopened bag in boiling water for about 10 minutes to ensure that, upon opening the bag and removing the tortillas, they will be limber and will unroll, without cracking, to be filled, rerolled and baked.

BRIEF DESCRIPTION OF THE DRAWINGS

FIG. 3 is a graph illustrating tortilla moisture content as a function of frying time at a constant temperature.

FIG. 4 is a graph illustrating tortilla oil content as a function of frying time.

DETAILED DESCRIPTION OF THE PREFERRED EMBODIMENTS

The tortilla dough or masa, prepared directly from corn kernels which have been soaked in water and lime or prepared from a dried corn flour which is mixed with water, is fed into a standard tortilla oven in regular bulk form. The oven is operated at a temperature of about 750°F and is provided with extruding or roller apparatus for forming the bulk masa into flat sheets of dough. Cutter apparatus within the oven serves to cut the flat sheets into the desired circular tortilla shapes. In accordance with known baking techniques, the tortilla remains in the oven for about 45 seconds, the tortilla exiting from the oven with an internal temperature of up to 212°F and with a water content of between 35 and 50 percent, generally about 40 percent. These above described steps are common in present day tortilla manufacture.

After exiting the oven, the tortilla is immersed in oil for frying at a suitable frying temperature, for example, from 250°F to 450°F and preferably from 275°F or 300°F to 400°F. To achieve the desired properties of the present product after frying, it is important that the temperature and time of frying be relatively mild so that the tortilla is lightly fried. One important effect of frying under the present conditions is the reduction of the microbial load of the fried product to the level of practical sterility so that the product is shelf stable. To accomplish sterility while retaining flexibility of the product, it is desirable to immerse the tortilla while at an elevated temperature into the frying oil to minimize the temperature rise required during frying. For this purpose, it is preferable that the tortilla be immersed in the frying oil immediately upon exiting the oven before the external or surface temperature of the tortilla has decreased significantly, e.g., to 140°F or less. Thus, the time between the completion of baking and frying is minimized, say, to less than 15 seconds. Another reason to avoid cooling the product between baking and frying is that moisture would be lost which could lead to brittleness after frying.

At the above temperatures, the tortilla remains in the frying oil for a suitable period of time, for example, about two to twenty seconds and preferably from four to twelve seconds. The tortilla emerges from the frying oil in a limber or flexible condition and with a good texture and mouth feel when subsequently prepared and consumed by the end user.

The oil temperature and frying time are adjusted so that the tortilla retains sufficient residual moisture for it to remain flexible. Unexpectedly, it has been found that at a residual moisture content in excess of approximately 13.5–15 percent, there is a marked change in the flexibility of the product. As illustrated hereinafter, at moisture contents below 13.5 percent, the tortilla becomes highly rigid. Conversely, the flexibility of the fried tortilla product remains relatively constant at moisture contents above a minimum value of 13.5–15 percent.

Figure 1:
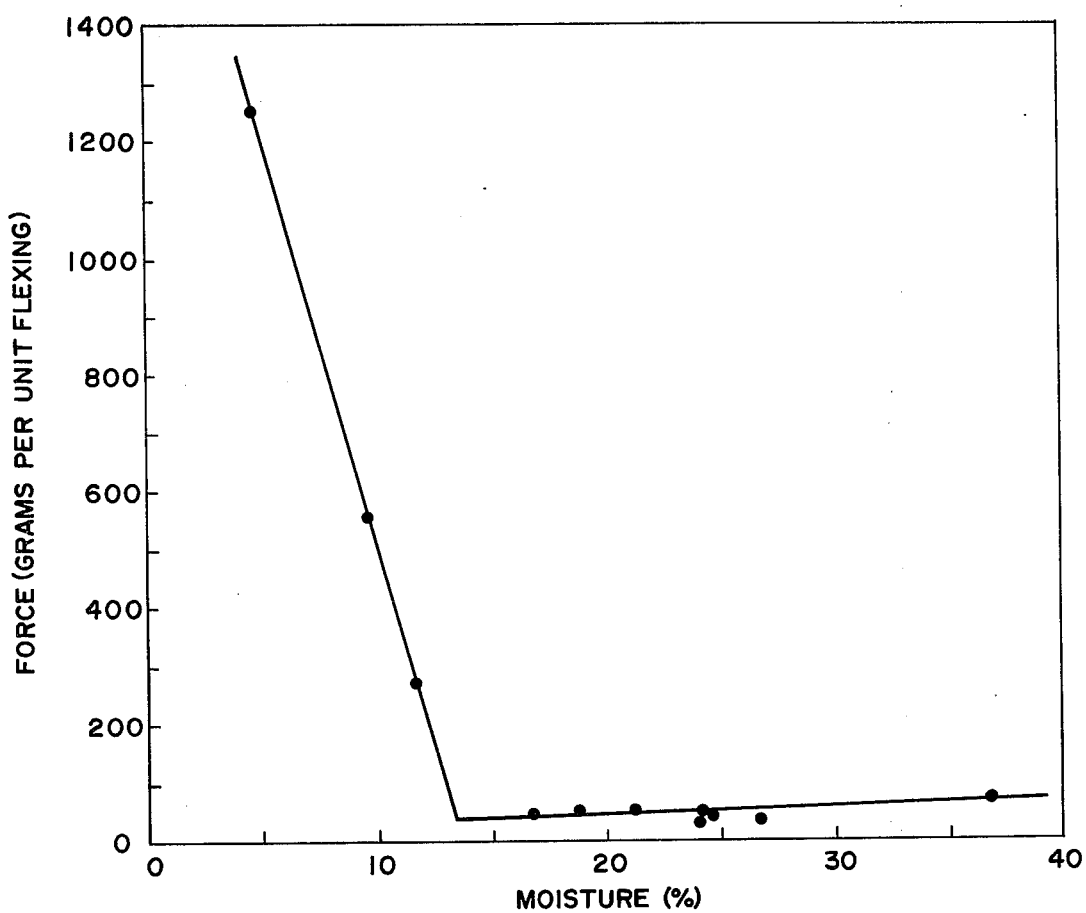
FIGS. 1 and 2 are graphs illustrating tortilla flexibility as a function of moisture content.
Figure 2:
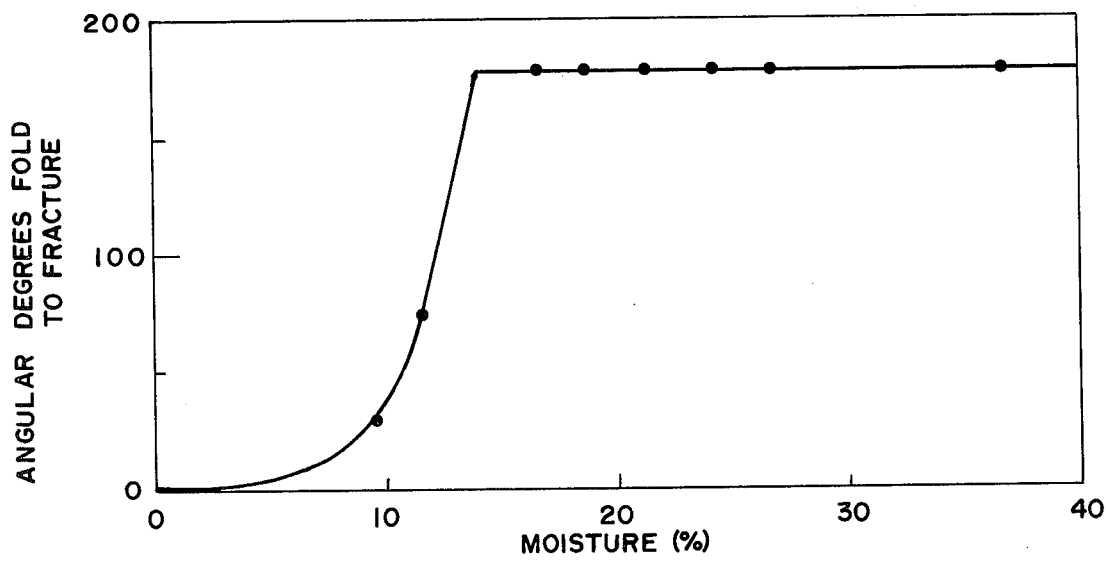

The above minimum moisture content for tortilla flexibility was empirically determined from two sets of experiments depicted graphically in FIGS. 1 and 2 herein. The tortillas for both experimental sets were standardized at a weight of 283 grams per dozen (about 22.4 grams/tortilla) and a size of six inches in diameter. The oil used for frying was safflower oil. The frying temperature was 300°F and the time varied to produce the different moisture contents for the tortillas.

FIG. 1 is a graph of the force required to flex a fried tortilla as a function of tortilla residual moisture content. Thus, the indicated force is inversely proportional to tortilla flexibility. The illustrated unit of force is the number of grams required to depress the center of the fried tortilla to a depth of 3/16 of an inch with the tortilla supported horizontally on the top of a four inch diameter cylinder by contact of the tortilla center with a one inch diameter probe.

It is apparent from FIG. 1 that flexibility dramatically decreased to brittleness below a residual moisture content of approximately 13.5 percent. Inflexibility and brittleness renders tortillas useless for the preparation of many Mexican foods such as enchiladas. Of course, in commercial operation, it is advisable to carry out the process so that the moisture content would be above this value as a margin for error to avoid brittleness.

Another test of flexibility as a function of fried tortilla moisture content is illustrated in FIG. 2. The maximum angle in degrees to which the fried tortilla can be folded without fracture is plotted against tortilla moisture content. Measurements were taken at 25°C approximately one hour after frying. According to this test, the value of 180° fold is the maximum measurable flexibility. At this level, a flat tortilla is capable of being folded flush back unto itself without fracture at the pivotal edge. This maximum flexibility according to this test was exhibited at a residual moisture content above about 14 percent, closely approximating the values of FIG. 1.

The maximum residual moisture content is determined indirectly by the original moisture content and the moisture loss during frying for the tortilla to absorb the oil in sufficient quantity for the desired taste and mouth feel of a "fried" tortilla. This upper limit of residual moisture content may vary from, say, 35–45 percent, depending upon the moisture content of the tortilla prior to frying. Thus, a relatively moist baked tortilla will retain more moisture in the formation of a tortilla fried to absorb the desired oil content for mouth feel and taste than will a relatively dry baked tortilla fried to the same oil content.

From the foregoing discussion it is apparent that a suitable range of residual moisture content of the fried tortilla is from 13.5 to 45 percent while a preferred range is from 15 to 35 percent.

FIG. 3 graphically illustrates experimental data plotting log of the residual moisture content of the tortilla expressed in percent by weight as a function of frying time. The conditions of frying are as follows: temperature of frying oil — 300°F, type of oil — safflower oil, and tortilla thickness — 283 grams/dozen. Under these conditions at a maximum frying time of approximately 29 seconds, a tortilla with a minimum residual moisture content for flexibility of about 13.5 percent was formed. A formula corresponding to a straight line fitted to the experimental data is as follows:

$$\text{Log (Moisture, \%)} = -0.0138t + 1.528, \quad (1)$$

wherein $t$ = frying time in seconds.

It is desirable to reduce the moisture content from a maximum in the fried product to minimize the risk of bacteriological spoilage. However, the lower limit of moisture reduction is governed by a minimum flexibility.

FIG. 4 is a graph plotting oil content of the fried tortilla as a function of frying time. The oil content approximates a logarithmic function of frying time but approaches an upper limit asymptotically. After a maximum oil content (approximately 18–25 percent) is absorbed by the tortilla, further frying apparently does not effect the oil content. The results are scattered suggesting random retention of oil in blisters and the like.

The amount of frying and, consequently the absorbed oil content of the tortilla should be sufficient to transform the unfried tortilla into one having fried characteristics including mouth feel and taste. Also, it has been found that a minimum amount of frying gives the tortilla a "rolled memory". That is, if the tortilla is rolled after a minimum amount of frying, cooled, and then is unrolled, with or without heating, the tortilla has an integral tendency to return to its rolled state. Thus, if the fried rolled tortilla is unrolled for filling and re-rolled, it tends to return to the rolled configuration. The fried tortilla is more flexible at an elevated temperature of, say, 150°F, at which the tortilla can be unrolled and rerolled without fracture. For the above characteristics, the fried tortilla may have as little as 8 percent total oil content in contrast to a value prior to frying of about 2 percent for a net increase of about 6 percent. Referring to FIG. 4, this tortilla oil content is reached in a frying time of less than 5 seconds at a temperature of 300°F.

It is believed that the major variables which determine the residual moisture content after frying are: (a) the thickness of the tortilla (conventionally measured in terms of grams/dozen of a six inch diameter product), (b) frying temperature, and (c) frying time. It is also believed that a given reduction in moisture content is directly proportional to the caloric transfer per unit thickness from the oil to the tortilla which, in turn, is directly proportional to both (a) the temperature differential between the oil and the tortilla and (b) frying time. Thus, the frying times of FIG. 3 for specified final tortilla moisture contents are decreased with an increase in temperature and increased with a decrease in temperature. Also, the temperature or frying time is directly dependent upon tortilla thickness.

The tortilla emerges from the frying oil at a very hot temperature, for example, an internal temperature of up to 212°F or more. While still hot and maintaining practical sterility (i.e., above 150°F), the individual tortillas are rolled into a tight spiral cross-section roll, i.e. with a leading edge rolled back against the tortilla sheet and with a small open central core. The tortillas are immediately inserted in a desired number, for example 8 to 12, into an aseptic container such as a plastic bag which is immediately sealed.

The bag is a moisture barrier bag and is preferably made of polyester-polyethylene copolymer or nylon-polyethylene copolymer. Such bags are now used in frozen food boil-in-bag packaging. The bag is a good moisture barrier when sealed, strong so as to withstand tearing and the like, and suitable for submersion in boiling water. The bag is highly resistant to the transmission of water vapor but sufficiently permeable to ambient gas (i.e., oxygen and carbon dioxide) to prevent growth of anaerobic microorganisms.

Since the tortillas are inserted into and sealed in the plastic bag while at an elevated temperature, the packaging is accomplished under conditions of practical sterility and the product is ready for delivery to the retail stores and the end consumer.

The packaged tortilla need not be refrigerated or frozen since it is shelf stable and may be maintained for a year or more before being opened and prepared for consumption.

The ultimate consumer further processes the tortilla for consumption by first immersing the bag unopened into a hot liquid such as boiling water, preferably for about 7–10 minutes, during which the temperature of the tortilla is elevated to aid flexibility. This is to insure that the tortilla will be at an elevated temperature in excess of, say, 150°F. At such temperatures, the tortilla is limber enough that, when removed from the package, it may be easily unrolled without fracturing. The unrolled tortilla is then prepared in the same manner as before by filling with an enchilada mix or a taco mix and by then rerolling into the enchilada or taco form and inserting into an oven for the final bake, if desired. Thus, the messy step of frying the tortilla in oil has been eliminated from the procedure necessary for the end user in preparing the final end product for consumption.

The fried tortillas are generally sufficiently flexible to be capable of unrolling without heating the bag. However, heating greatly assists manipulation.

The particular features and advantages of the tortilla prepared in accordance with the present invention include (a) shelf stability of the packaged product without refrigeration or freezing, (b) flexibility or limberness because of its high residual moisture content, for example, 15 to 35 percent, (c) good texture, mouth feel and taste to the end consumer, and (d) a rolled memory in the tortilla. Also the very undesirable step of frying on the part of the end user is eliminated and accomplished, instead, during the initial manufacturing of the tortilla product. The limberness of the tortilla insures that the tortilla can be unrolled for filling and rerolled for baking as necessary for making enchiladas. Because of the rolled memory, the tortilla is readily rerolled after filling and retains a rolled shape. Still a further advantage of the present invention is the fact that the sealed packaged tortillas may be sold in a carton with the canned sauces and beans or other ingredients necessary to prepare a taco or enchilada by the simple addition of the meat product by the end user.

Although it is preferable to roll the product after a minimum amount of frying because of the above rolled memory characteristic, the tortillas may be packaged flat in a stack and rolled at elevated temperatures. However, the product would retain a memory for a flat shape and so have a tendency to unroll in time. The bag need not be plastic but may be aluminum or some combination, or other forms of moisture barrier container such as a can.

I claim:

1. A process for forming a packaged, fried, shelf-stable, flexible tortilla comprising the steps of
 a. lightly frying a hot, pre-baked tortilla in oil at an elevated temperature for a time selected to sterilize said tortilla and retain at least 13.5% residual moisture in the tortilla for it to remain flexible, whereby the tortilla is capable of being formed into a spiral cross-section after frying while still at an elevated temperature before packaging,
 b. maintaining the fried sterile tortilla at an elevated temperature, and
 c. packaging and sealing the fried and sterile tortilla in a moisture-proof container at an elevated temperature, whereby the tortilla is capable of being heated in a hot liquid in the container to a temperature at which the tortilla can be readily removed from the container without breakage.

2. A process as in claim 1 in which the frying step is carried out for a time period of between 2 and 30 seconds and at an oil frying temperature ranging from 250° to 450°F.

3. A process as in claim 1 in which the temperature of the frying oil ranges from 300° to 350°F, and the time duration of said frying is between 4 and 12 seconds.

4. A process as in claim 1 in which the oil content of the tortilla after the frying step is at least 8 percent.

5. A process as in claim 1 in which said moisture content is in a range from 15 to 45 percent.

6. A process as in claim 1 in which said tortilla is pre-baked and immersed in said frying oil while at a temperature of at least 150°F after said baking.

7. A process as in claim 1 in which the temperature of the fried tortilla during packaging and sealing is maintained above 140°F.

8. A process as in claim 1 including the steps of forming the tortilla into a spiral cross-section roll after frying while still at an elevated temperature and before packaging.

9. A process as in claim 8 including the step of heating said packaged and sealed rolled tortilla in a hot liquid to a temperature at which the tortilla may be removed from the package and unrolled without breakage.

10. A process as in claim 1 in which said fried tortilla is packaged and sealed while its temperature is above 150°F.

11. A product formed by the process of claim 1.

* * * * *